United States Patent [19]

Burlingame

[11] 4,044,459
[45] * Aug. 30, 1977

[54] HIGH-GRADE METALLIC PRODUCTS

[75] Inventor: Richard D. Burlingame, Cleveland Heights, Ohio

[73] Assignee: Luria Brothers & Co., Inc., Cleveland, Ohio

[*] Notice: The portion of the term of this patent subsequent to May 20, 1992, has been disclaimed.

[21] Appl. No.: 544,882

[22] Filed: Jan. 29, 1975

Related U.S. Application Data

[62] Division of Ser. No. 412,119, Nov. 2, 1973, Pat. No. 3,883,997.

[51] Int. Cl.² .............................................. B08B 3/10
[52] U.S. Cl. .................................................... 29/614
[58] Field of Search ............... 75/.5 BA, 24, .5 B, 75/.5 R, .5 C, 43, 44 S; 241/DIG. 21; 29/183.5, 180 R, 193

[56] References Cited

U.S. PATENT DOCUMENTS

| | | | |
|---|---|---|---|
| 1,309,165 | 7/1919 | White | 75/24 |
| 2,861,879 | 11/1958 | Michalke | 75/.5 BA |
| 3,635,699 | 1/1972 | Chadwick | 75/.5 BA |
| 3,770,424 | 11/1973 | Floyd et al. | 75/24 |
| 3,883,997 | 5/1975 | Burlingame | 241/DIG. 21 |

FOREIGN PATENT DOCUMENTS 240,718  9/1962  Australia ................... 241/DIG. 21

Primary Examiner—M. J. Andrews
Attorney, Agent, or Firm—Robert S. Bramson; James Albert Drobile

[57] ABSTRACT

Process for recovering high-grade blast furnace iron or other metal from pieces of blast furnace iron or such other metal and blast furnace slag having large amounts of such blast furnace slag, by tumbling a substantial number of such pieces to achieve a constant redistribution thereof while impacting at least a substantial portion of such pieces with a high velocity, relatively small diameter shot or grit which has a hardness which is greater than the hardness of the slag, thereby abrading the impurity, while leaving the body of non-impurity substantially intact. A product comprising a large body of high-grade blast furnace iron or other metal and having a substantial number of superficial irregularities, crevices and fissures containing only a small amount of blast furnace slag adhered in said irregularities, crevices and fissures, the amount of blast furnace slag being no more than about ten percent by weight of the total product, and preferably no more than about two to three percent by weight of such product.

3 Claims, 5 Drawing Figures

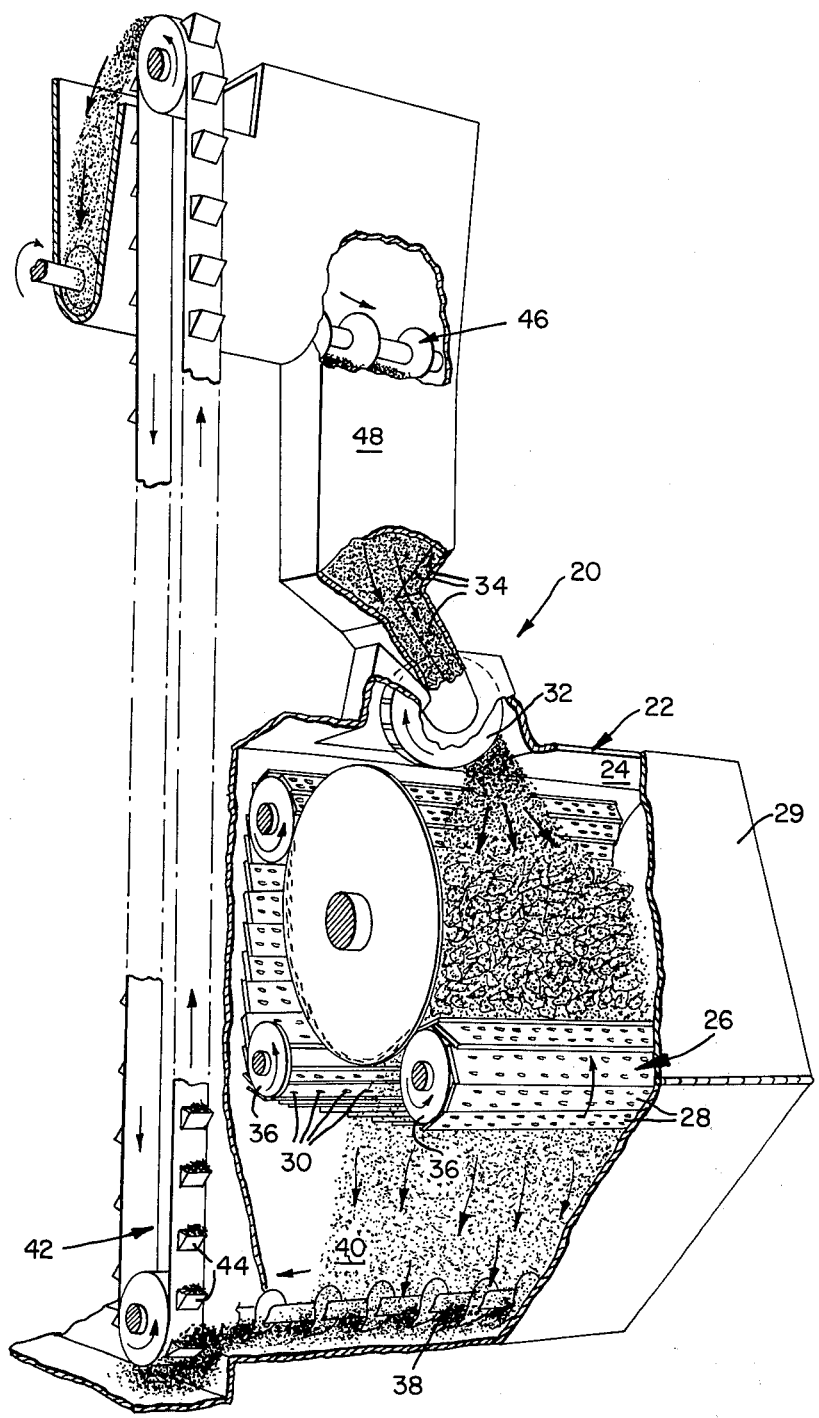
FIG. I

HIGH-GRADE METALLIC PRODUCTS

This is a division of application Ser. No. 412,119 filed Nov. 2, 1973 now U.S. Pat. No. 3,883,997.

BACKGROUND OF THE INVENTION

1. Field of the Invention

The invention relates to the field of iron and steelmaking, and the refining of other metals, and particularly relates to a process of recovering, from a blast furnace operation, high-grade metal having a substantial amount of impurity, and then removing the impurity to allow the metal commercially to be used.

2. State of the Art

In the normal operation of iron blast furnaces, liquid iron is continuously collected in the hearth, and liquid slag is simultaneously forming and collecting as a separate, completely immiscible layer on top of the iron. As used herein, the term "slag" means any material having a high degree of impurities. "Iron slag," the precise composition of which can vary substantially, is produced in the production of blast furnace iron and typically will have an approximate composition of 38 percent by weight of calcium oxide, 13 percent of magnesium oxide, 36 percent of silicon dioxide, 10 percent of aluminum oxide, 1.5 percent of sulfur, and minor amounts of other metallic oxides.

In all iron blast furnaces, the liquid iron slag must be flushed out every few hours. This iron slag is usually removed by allowing it to flow through a tap hole, known as a "slag notch" or "cinder notch," which is located high in the blast furnace at approximately the normal level of the slag. The molten iron slag is thus allowed to run out of the blast furnace every few hours, in order to prevent accumulation of undue amounts of the slag. However, because iron is constantly migrating through the slag layer during the operation of the furnace, the pouring of the iron slag will result in a concomitant loss of approximately 1 percent by weight of the total amount of iron produced by the blast furnace.

A typical blast furnace will produce approximately 3,000 tons of iron per day, and large blast furnaces may produce as much as 10,000 tons of iron per day or more. It is therefore quite common to experience a loss of from about 30 to 100 tons per day of iron with the removal of the iron slag from the blast furnace. Iron, with an acceptably low level of impurities contained therein, as is found in normal blast furnaces, has a very substantial value. Thus, such losses of up to 100 tons of iron per day are obviously substantial and are desired to be minimized or eliminated completely.

In the common prior art process, the molten blast furnace iron slag is conveyed into one of two large, walled-in slag pits located right next to the furnace, where it is allowed to solidify and cool. The slag pit contains primarily slag, having, however, substantial irregular-shaped masses of iron of widely-varying size scattered throughout the slag, like raisins in a cake. Depending primarily on the quality of the raw materials entering the blast furnace, i.e. iron ore, coke and limestone, the amount of iron slag produced per ton of iron will vary substantially, and the amount of iron distributed throughout the slag pit is usually in the range from about two to five percent by weight of the total slag pit contents. The iron distributed through the iron slag in the slag pit is the same as the regular blast furnace iron product, having a relatively low level of impurities and high economic value, if it can be separated adequately from the surrounding iron slag.

When the slag pit being worked is full, the slag from the blast furnace is then channelled to the other slag pit, which is then empty, having earlier been emptied by power shovels and trucks while the other slag pit was being filled. These power shovels and trucks are moved over to the full pit, after a period of time has elapsed to allow solidification of the iron slag, and the trucks are filled by the power shovels with large chunks of slag from the slag pit, which are transported to a slag processing facility, generally located nearby.

In the slag processing facility, the large chunks of slag, having dimensions of up to several feet, are impacted by heavy wrecking balls, to crush the slag into pieces generally of up to two feet in maximum dimension. In the past, when the slag processor had broken the iron pieces contained in the slag down to a size which could be accommodated by an open hearth furnace charging pan, this iron-containing material, called blast furnace slag iron herein, was separated from the pieces of iron slag by use of an electromagnet, to be recycled to an open hearth furnace. These blast furnace slag iron pieces, are highly variable in their iron and iron slag content, but will frequently comprise about 60 to 80 percent of blast furnace iron, having a low sulfur content of typically about .03 percent by weight, and 20 to 40 percent of iron slag, having a sulfur content of about 1 to 2 percent by weight.

Because of the substantial time involved in producing steel using an open hearth furnace, due to the inherently long melting, refining and superheating cycle, the blast furnace slag iron pieces, which have a high sulfur content — since there is 1 to 2 percent of sulfur in the slag — were still reusable, and could be used in open hearth steel production. The considerable melting and refining time inherent in the operation of open hearth furnaces, allowed ample opportunity for all of the sulfur to be removed in the open hearth furnaces. Therefore, so long as open hearth furnaces were popular, no major problem was encountered in recycling blast furnace slag iron.

However, basic oxygen furnace steelmaking is steadily replacing basic open hearth steelmaking as the process of choice for converting blast furnace iron to steel. It is expected that, in a relatively short period of time, substantially all blast furnace iron in the United States will be refined to steel by the basic oxygen furnace method. Although the basic oxygen furnace process is vastly superior to the open hearth process in most ways, the basic oxygen furnace is inferior with respect to its flexibility in handling scrap metals, such as the blast furnace slag iron pieces described above. In particular, most basic oxygen furnace operators prefer to exclude these blast furnace slag iron pieces from their charges, because these pieces are usually considered to be too high in sulfur content for optimum efficiency steelmaking, due to their excess iron slag content. Unimproved blast furnace slag iron is not suitable for basic oxygen furnace processing, because of the relatively short residence time of the iron in the basic oxygen furnace. This residence time is usually not adequate to achieve sufficient desulfurization of the relatively high sulfur content blast furnace slag iron pieces. Therefore, in any integrated steel mill having only basic oxygen furnace steelmaking producton, the blast furnace slag iron pieces produced from the mill's blast furnace slag are commonly accumulated in large stockpiles as a low grade form of scrap, too good to haul to the dump, but not good enough to charge, as is, into the steelmaking basic oxygen furnace. This scrap has had a very low economic value in the past because, in addition to its unsuitability for basic oxygen steelmaking, it could not be utilized in any other sector of the ferrous industries, such as in iron foundries.

The process of this invention involves the use of a shot blasting and tumbling machine, of a type well known in the art and more fully described below. This machine is frequently used to clean loosely adherent sand from foundry castings. However, this use does not entail the removal of a hard material, firmly attached to the iron, from minute fissures and crevices such as is involved in the process of this invention to remove almost all of the slag from blast furnace slag iron pieces.

BRIEF SUMMARY OF THE INVENTION

The instant invention overcomes the shortcomings of prior art processes and products by providing a process for recovering relatively low sulfur content, low slag content blast furnace iron from a crude material, called blast furnace slag iron pieces, having a large amount of iron slag contained on the surface thereof and extending from the surface thereof into the body thereof through cavities, fissures and the like. This process, although disclosed to be utilized to remove blast furnace slag from blast furnace slag iron pieces, may also be utilized to remove slag impurities from other refined metals such as aluminum, zinc, copper and the like.

In the practice of the process of this invention, the slag and metal chunks are broken up into pieces, having sizes of up to a maximum dimension of about two or three feet, in order to make it possible to charge them into conventional shot blasting machines and, when most of the slag has been removed, to charge them into basic oxygen furnaces, electric furnaces, iron foundry cupolas and the like, for further use of the iron. A typical piece will have a non-geometric shape and dimensions up to about two feet by two feet by six inches. However, because of the random way in which the slag is broken into pieces, any given slag pit will produce blast furnace slag iron pieces having a wide variety of shapes and sizes, down to as little as about one-quarter inch.

In the practice of this process, the blast furnace slag iron pieces, or pieces of other metal and slag, are first prepared into suitable sizes, by the use of wrecking balls or similar well-known techniques. The pieces containing significant quantities of blast furnace iron or other metal to be recovered are then separated from the other, principally slag containing, pieces. In the case of iron, this separation may easily be effected by the use of an electromagnet. The suitably sized pieces are then transported, as by trucks, conveyor belts, railroad cars, or the like to the slag processing unit.

The slag processing unit is a tumbling and shot blasting machine, of a general type which is known in the art and commercially available. In this machine, the charge of slag-metal pieces, such as blast furnace slag iron, are placed in a suitable location, such as in a container, wherein they are operated on by a conveyor, rotating and tumbling the mass of individual pieces about, in order to achieve a continuing redistribution of the pieces. As this continuing redistribution is taking place, the pieces on at least one face of the tumbling mass are subjected to the impact of a continuous flow of relatively high velocity, hard pellets or similarly shaped particles, commonly called shot or grit. Shot is relatively uniformly shaped, usually spherical, particles of metal, typically a relatively hard high carbon steel alloy. Grit is similar to shot, but instead of being spherical, it has facets and sharp corners. The hardness of the shot or grit must be substantially greater than the hardness of the slag, so that the shot or grit will erode the slag when the slag metal pieces are impacted with the high velocity shot or grit.

This shot or grit is impacted against the slag-metal pieces, using a relatively high velocity impeller, for taking large quantities of the shot or grit and impelling them against the slag-metal pieces at relatively high velocity. This impact, occurring relatively continuously, while continuously redistributing the slag-metal pieces, such as blast furnace slag iron pieces, throughout the mass of such pieces, allows the achievement of relatively uniform exposure of all surfaces of all of the slag-metal pieces to the impact of the shot or grit. As a result of this process, in a relatively short period of time, on the order of about 10 minutes to about 1 or 2 hours, a surprisingly good removal of the slag from the pieces is achieved, not only at the surface of each piece, but also extending substantially downwardly into most, if not all, of the crevices and fissures in the piece. If the process begins with blast furnace slag iron pieces which have a slag content of about 20 to 40 percent by weight and a corresponding blast furnace iron content of about 60 to 80 percent by weight, enough slag may be removed by this process that the final pieces will have a slag content as low as about two percent by weight.

The precise slag content of the final product can be regulated by varying the conditions of the process, and particularly the size of the shot or grit, the amount of shot or grit used, the velocity imparted to the shot or grit, the duration of the shot blasting process, and the extent to which the shot blasting enclosure is filled with slag-metal pieces. To a lesser extent, some of the superficial removal of slag is dependent upon the amount of tumbling of the individual pieces which is achieved by the conveyor for these pieces. However, this tumbling only removes surface slag, and is definitely not capable of removing, by itself, the slag located in fissures and crevices, which must be removed as well in order to be able to achieve a commercially valuable product having relatively low slag content, on the order of ten percent by weight or preferably even less.

The product of the invention is a body of metal, blast furnace iron when the process is applied to blast furnace slag iron pieces, comprising an irregularly shaped body, the dimensions of which may vary within wide limits from a fraction of an inch to approximately two or three feet, and which has a multiplicity of surface-exposed fissures and crevices throughout the body, these fissures and crevices being relatively free of slag, the individual pieces having a total slag content of up to about ten percent by weight and preferably no more than about two or three percent by weight.

It is important to note that, because of the nature of the process, the slag which is located in deep crevices or fissures which extend to the surface of the individual pieces is accessible to the shot or grit and can be removed substantially completely by the impacting of shot or grit on those pieces.

In the process of the invention, the shot or grit impacting the slag produces a large quantity of relatively fine slag particles, as a residue of the process. These particles may be utilized as a component of Portland cement or the like in order to realize some economic value from this otherwise useless slag.

OBJECTS OF THE INVENTION

It is therefore an object of this invention to provide a process for removing substantially all of the slag from pieces comprising a relatively high purity metal having substantial amounts of slag thereon and extending deeply and tenaciously into crevices and fissures accessible to the surface of each piece.

Yet another object of this invention is to provide a process for removing from blast furnace slag iron pieces the majority of the slag to produce a product which has a slag content of no more than approximately ten percent by weight, and preferably no more than two or three percent by weight.

Still another object of this invention is to provide a slag removal process, capable of removing slag from highly irregularly shaped surfaces of metal, which is applicable to a wide variety of metals, including iron, copper, aluminum, zinc and the like.

A still further object of this invention is to provide a metal product having the purity of a blast furnace metal, and having a large degree of surface irregularities, such as fissures and crevices, which are substantially free of impurities, containing no more than about 2 percent by weight of the impurities.

DETAILED DESCRIPTION OF THE DRAWINGS

FIG. 1 is a schematic representation, in perspective, of a tumbling and blasting machine which may be utilized in the practice of the process of this invention.

DETAILED DESCRIPTION OF THE INVENTION

Figure 2:
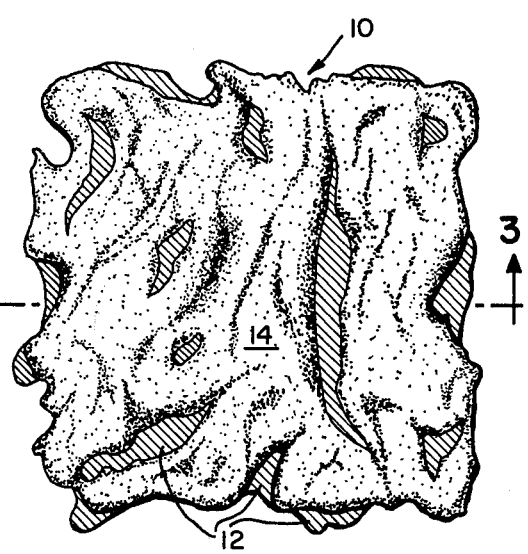
FIG. 2 is a top plan view of a representative piece of blast furnace slag iron prior to treatment by the process of the invention.

Viewing FIG. 2, the numeral 10 generally designates a representative blast furnace slag iron piece. The piece illustrated, which will have a maximum dimension of approximately 2 or 3 feet and a maximum thickness of approximately 6 inches, comprises a principal continuous phase of blast furnace iron, generally designated by the numeral 12, and an outer covering of slag, generally designated by the numeral 14.

Figure 3:
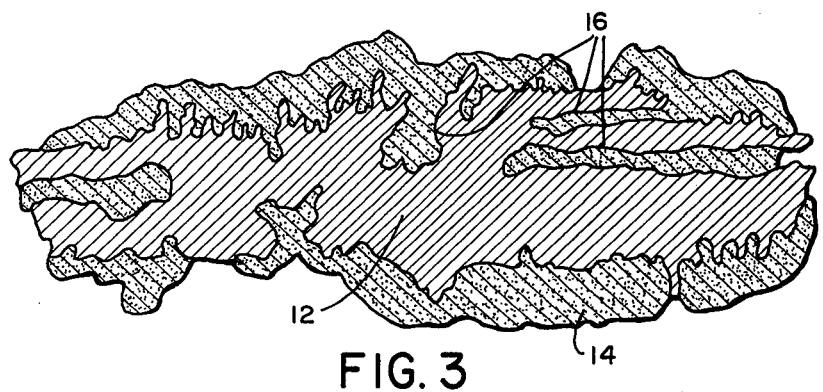
FIG. 3 is a cross-sectional view taken along 3—3 of FIG. 2.

Viewing FIG. 3, it will be seen that the body of iron contains a large number of crevices and fissures, of varying depths, sizes and shapes. Many of these fissures, which are generally designated by numeral 16, are substantially filled with varying amounts of hard, tough, tightly adhering slag.

Figure 4:
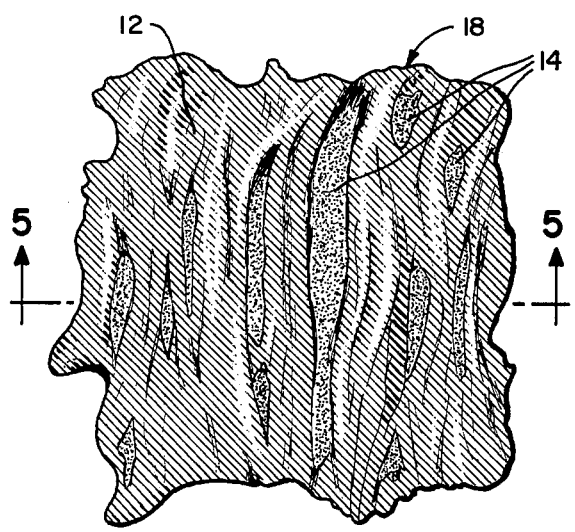
FIG. 4 is a top plan view of the product of this invention, corresponding essentially to the raw material of FIG. 2 with a majority of the slag removed, so that the final slag content of the product is no more than about two percent by weight.
Figure 5:
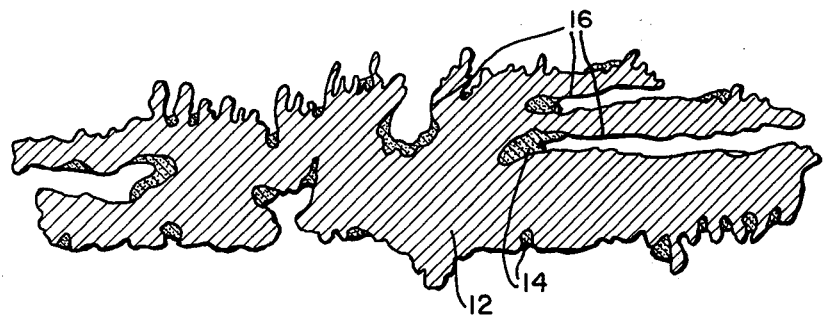
FIG. 5 is a cross-sectional view, taken along line 5-5 of FIG. 4.

Viewing FIG. 3, it will be seen that such portions of iron as are generally designated by numeral 12 are seen in FIG. 2 as being quite small and superficially exposed iron segments on the surface of piece 10. In FIG. 4 and 5, the final blast furnace iron product of this invention is generally designated by numeral 18.

It should be understood that FIGS. 2 to 5 inclusive are intended merely to be general schematic representations of what a piece of blast furnace slag iron may look like before and after the process of this invention and do not correspond precisely to any given piece of material.

Pieces 10 are formed from a blast furnace when the molten slag, containing about two to about five percent of molten iron, is "tapped off" through the slag notch or cinder notch of a conventional blast furnace. That iron and slag mixture is flowed, in the molten state, into suitable slag pits, where it is allowed to harden. This pit material is broken up and removed to a slag processing facility, where relatively large chunks of iron and slag are broken down into substantially smaller blast furnace slag iron pieces, such as by the use of a wrecking ball.

In a typical example, a wrecking ball weighing at least 15 tons would be dropped onto the pieces of iron and slag from a height of at least 60 feet. This process shatters the slag into a large number of small pieces, from which the iron-containing blast furnace slag iron pieces may be separated by the use of a suitable electromagnet which can be adjusted to separate out only pieces having a predetermined amount of iron. Therefore, although the slag pit contains a predominant amount of slag and a relatively minor amount of iron 2 to 5 percent), the blast furnace slag iron pieces which are removed at the slag processing facility will comprise only those pieces having some significant amount of iron. The pieces which are utilized in the process of this invention will desirably have sized of up to approximately 2 or 3 feet in maximum dimension, any larger pieces being impacted again with the wrecking ball, to reduce their size to a suitable handleable size. The maximum size of these pieces is determined by the size of piece that can be charged into and efficiently processed in, a shot blasting machine and subsequently accommodated in a melting furnace.

These blast furnace slag iron pieces, having maximum dimensions of up to two or three feet, are then transported, as by conveyor, truck, or railroad car to the final processing facility.

FIG. 1 illustrates schematically one form of tumbling and shot blasting machine usable in the process of this invention, which is commercially available. One suitable such tumbling and shot blasting machine is sold by Wheelabrator-Frye Inc. under the "Super-Tumblast" trademark. These machines, which come in different sizes and capacities, essentially comprise an enclosed chamber in which a given quantity of material is charged, and in which the mass of pieces is tumbled while it is impacted by a recirculating, high velocity continuous stream of pellets of shot or grit, which are discharged downwardly onto the mass of rotating pieces.

Viewing FIG. 1, the tumbling and shot blasting machine, which is generally designated by numeral 20, is seen to comprise a housing 22 in which is formed an enclosure 24 into which the pieces to be worked on are charged. Enclosure 24 has a door 29 which can be opened for inserting and removing the pieces 10, and which is closed during the actual tumbling and shot blasting operation. Located within enclosure 24 is conveyor 26, which is an L-shaped conveyor, comprising individual metal slats 28, each of which has a plurality of circular apertures 30. Each of the apertures 30 has a diameter of approximately ⅜ inch. The conveyor 26 is mounted for counterclockwise movement, during the shot blasting step, on a plurality of drive wheels 36 which are driven by a suitable drive motor (not shown). The conveyor direction is reversed to discharge finished product from the shot blasting machine.

The conveyor 26 has a vertical section and a horizontal section, forming an L-shape. When the pieces 10 to be treated are loaded into enclosure 24, they are placed on top of the horizontal surface of the conveyor 26. The drive motor for conveyor 26 may be reversible, so that it may be reversed to facilitate discharge of the finished pieces when door 29 is opened. A typical drive speed for conveyor 26 is fifteen feet per minute.

Located in the upper portion of the housng 20 are one or two rotatably mounted thrust members 32 called throwing wheels or impellers, the purpose of which is continuously to deliver large quantities of shot or grit, at high velocity, against the upper face of the mass of pieces 10 located in enclosure 24. For simplicity, only one throwing wheel is illustrated, but, if two wheels are utilized, as is preferred, both wheels are of the same size and the two wheels are parallel. The two throwing wheels 32 are, in a preferred embodiment of the invention, rotated at approximately 3,600 rpm, and are each 15 inches in diameter. The two wheels 32 may each be driven by a motor (not shown) of about 60 to about 75 horsepower, and each imparts to the shot a tangential velocity of approximately 19,000 feet per minute. The throwing wheels will preferably deliver in the range from about 2,000 to about 4,000 pounds of shot per minute, if an enclosure 24 having a capacity to handle about fifty cubic feet of slag iron pieces 10 is used. The design of the throwing wheels and their details are well known.

As illustrated in FIG. 1, the shot is generally designated by numeral 34 and preferably comprises small, hard spherical balls, more fully described below.

It is important to note that, for optimum operating efficiency, the enclosure 24 is filled with pieces 10 only to a level of about four-tenths of the total height of the enclosure, thus occupying about 40 percent of the enclosure volume. It is this optimum volume which is occupied which is used to designate the machine capacity. Thus a 50 cubic foot machine contains material occupying 50 cubic feet, when it is 40 percent filled. This design capacity is selected to give the optimum efficiency of the shot blasting operation, and other volumes may be used, but with less efficiency.

The shot 34 impacts the upper surfaces of the mass of blast furnace slag iron pieces 10 and, because of the substantial hardness and kinetic energy of the shot, abrades away the slag 14 in small pieces, generally on the order of less than several hundredths of an inch in size. Also, some larger pieces of slag are broken away from the pieces 10 by virtue of the impact of the various pieces 10 against each other as they are tumbled about enclosure 24 because of the movement of conveyor 26.

The movement of conveyor 26 effects a continuous tumbling movement and redistribution of the pieces 10 within enclosure 24, so that different pieces and different surfaces of each piece are continuously exposed to the direct impact of the high velocity shot 34, thereby to effect a uniform abrasion of the slag from the iron or other metal to be recovered. After each piece of shot impacts one or more pieces 10, it passes downwardly through the mass of those pieces to the conveyor 26, where the movement of the pieces 10 on the conveyor 26 causes a flow of the individual shot members. The pieces of shot exit the enclosure 24 by passing downwardly through apertures 30 in the slats 28 of conveyor 26. The apertures 30 are approximately ⅛ of an inch in diameter, and will also, therefore, pass appropriately small pieces of slag, and occasional small pieces of iron which may also be abraded in the enclosure 24. These small peices of shot, slag and iron, all of which are necessarily less than ⅛ inch in maximum dimension, pass through the apertures 30 in the slats 28 and fall into enclosure 40 in the bottom of the unit 20, where they are transported by conveyor screw 38.

The conveyor 38 may be a screw conveyor or a shaking conveyor, which transports the combination of shot, slag and iron across a screen of ¼ inch mesh (not shown). The particles which are greater than ¼ inch in size remain on the screen, and constitute mostly slag particles and some iron. These particles are then passed, by a suitable conveyor (not shown), past a magnetic separator, which recovers the highly magnetic materials, comprising both iron and slag, but having enough iron to merit recovery for subsequent recovery and reuse. The particles which are less than ¼ inch in diameter, comprising all of the shot, most of the slag particles generated by the shot blasting operation and some iron particles, drop freely vertically through the screen and are conveyed by bucket elevator 42 and screw conveyor 46 to an air separator (not shown) where the cascading stream of particles is contacted by a high velocity air stream. This air separator is located in the upper chamber 48. Because the slag is of substantially lower density than the shot (or grit), it is blown further away by the air stream and is blown into a ducting system (not shown) which transports the slag to a bag house. The heavier shot and smaller slag iron pieces are not blown as far as the larger slag pieces, and they fall into shot hoppers (not shown) in chamber 48. These shot hoppers have adjustable discharge openings, and they function to keep the throwing wheels loaded with shot.

It is notable that the slag particles which pass through the screen, having a ¼ inch or less size, as well as the very fine slag collected in the bag house, could be used as a component of certain types of cement which normally incorporate blast furnace slag therein.

It is to be noted that the structural details of the tumbling and shot blasting mechanism 20 are well known in the art and form no part of this invention. In the most preferable embodiment of the invention, the tumbling and shot blasting unit is of at least 50 cubic foot size, that is to say, the optimum working capacity of enclosure 24 is 50 cubic feet.

In the operation of the process of this invention, it is first necessary to reduce the slag iron pieces to usable sizes of up to approximately two or three feet in maximum dimensions. A substantial number of these pieces, typically comprising a charge weighing about 5,500 to 6,000 pounds, when a fifty cubic foot enclosure 24 is used, are then placed in a suitable tumbling and shot blasting mechanism 20 for the purpose of providing a relatively continuous tumbling and agitation of the individual pieces.

The individual pieces are then subjected to the impact of a high velocity stream of small spherical steel shot or hard grit 34, having a flow rate in the range from about 2,000 to about 4,000 pounds per minute and a hardness which is substantially greater than the hardness of the slag and having a size which is in the range of up to about one-tenth of an inch, and is preferably in the range from approximately 0.025 inches to approximately 0.060 inches for a period in the range from about ten to about sixty minutes. It has been found that the smaller particles, preferably about 0.039 inches nominal size, provide a more effective cleaning, in that they are better able to penetrate deeply into any crevices and fissures in the blast furnace slag iron pieces. It is to be noted that when shot is sold the individual particles usually cover a range of sizes around the specification size. Therefore, if 0.039 inch shot is specified, some of the pieces supplied will be somewhat less than 0.039 inches in diameter and some slightly greater than that size.

It is also notable that there are approximately 400,000 shot pellets per pound, if a 0.039 inch diameter steel shot is used, and that this would desirably produce a flow rate of approximately 3,000 pounds per minute using two 15 inch diameter throwing wheels 32, each driven by a 75 horsepower motor. The shot consists of a high carbon steel alloyed with chromium, having about 1 percent carbon, and having a hardness of approximately 48 on the Rockwell C scale. A desirable shot having these characteristics is sold by Wheelabrator-Frye Inc. under the designation S-390.

The velocity imparted to the shot or grit and its flow rate may be varied within wide ranges, and the precise velocity and flow rate utilized will depend upon the size of the available drive motor for the throwing wheel and the time period within which it is desired to clean the slag from the iron. Desirably, the velocity imparted to the shot or grit, for a fifty cubic foot volume of charge, will be in the range from approximately 10,000 to approximately 35,000 feet per minute, leaving the throwing wheel. It is most preferred to impart a velocity of approximately 19,000 feet per minute at the throwing wheel, when utilizing a 50 cubic foot machine. The optimum flow rate for a fifty cubic foot charge would be about 3,000 pounds per minute.

EXAMPLE I.

Approximately 20,000 pounds of blast furnace slag iron having sizes of up to 2 or 3 feet in maximum dimensions and thicknesses of up to about 6 inches, were processed using the method of this invention. The machine utilized for the processing was a 50 cubic foot Wheelabrator Super-Tumblast, having two 60 horsepower throwing wheels and utilizing steel shot having a 0.055 inch nominal diameter, and designated as S-550 shot. This machine imparts approximately 19,000 feet per minute of linear velocity to the steel shot at the point of departure from the throwing wheel at a flow rate of about 2,400 pounds per minute. The conveyor 26 was set at an operating speed of approximately 15 linear feet per minute.

In one instance, the enclosure was loaded with approximately 4,200pounds of the slag iron pieces, and in each of two other instances it was loaded with approximately 7,500 pounds of the slag iron pieces. The 4,200 pound batch was processed for 15 minutes, one of the 7,500 pound batches was processed for 25 minutes, and the other was processed for 40 minutes.

The 4,200 pound batch was inspected at various stages during the fifteen minute blast period. After five minutes of processing, cleaning was well under way, but the product was not yet satisfactory. After 10 minutes, the product was judged to be at least 90 percent metallic, and after 15 minutes the material was at least 96 to 97 percent metallic.

The two 7,500 pound batches constituted grossly overloaded conditions for the 50 cubic foot Super-Tumblast, which really should not be charged with more than 5,500 to 6,000 pounds of slag iron for efficient processing. It was a matter of practical interest, however, to observe just how well the machine would do under these conditions.

With the first 7,500 pound test, fifteen minutes of processing gave good results, but the percentage of metallics was not as high as it was in the case of the 4,200 pound batch after the same blasting time. This was to be expected, because in the case of the 7,500 pound load, the pieces did not receive the degree of exposure to the shot that they received in the 4,200 pound load. After a total of 25 minutes of processing, this load had been cleaned of slag up to the same percentage of metallics as was observed after 15 minutes of processing with the 4,200 pound batch.

In the second 7,500 pound test, the material was inspected after thirty minutes of processing, and it was found to be at least 96 percent metallic. After 40 minutes of processing, the product was at least 98 percent metallic.

EXAMPLE II.

A different 50 cubic foot Super-Tumblast unit was employed for a second series of tests. It was decided that, although the equipment performs rather well when overloaded, it is better to charge the machine with no more than the recommended 50 cubic feet of slag iron, which weighed about 5,700 to 6,000 pounds.

The only other significant difference in the test conditions between Example I and II was that in Example II, the shot diameter was 0.039 inches, compared to 0.055 inches in Example I.

Four tests were conducted for this Example in order to prepare material of varying cleanliness (freedom from slag) by varying the length of the processing time. One load was processed for 20 minutes, one for 30 minutes, and two for 40 minutes.

The results of the 30 and 40 minute processing cycles were excellent; at least 98 percent metallics had been achieved in all three tests. Essentially 95 percent metallics was reached in the 20 minute processing.

Generally speaking, the results of the second series of tests were superior to those of the first. This conclusion is attributed mainly to the smaller shot diameter, which apparently penetrated the crevices of the pieces more thoroughly than did the coarser shot of the first series.

It is notable that the process of this invention is equally applicable to the steel metallics magnetically extracted from the slag produced by basic oxygen furnaces, open hearth furnaces, and electric arc furnaces, and to iron metallics recovered from various foundry melting slags.

The product of this invention is a body of a relatively high purity metal, which may be blast furnace iron, steel aluminum, zinc, copper or the like. The product has an irregular surface having a substantial number of crevices and fissures, which are free of slag, the total slag content of each piece being no more than about 10 percent by weight and preferably being no more than about 2 percent by weight.

The iron product of this invention can be used in all forms of steel making. That is to say, the cleaned blast furnace iron can be used in making steel by any process, as well as in making iron castings, as a substitute for the cast iron scrap and pig iron normally used in making iron castings. The ultimate composition of the product of this invention would most desirably be no less than about 98 percent iron and no more than 2 percent slag, and have a total of no more than up to approximately 0.05 percent by weight of sulfur. It is to be noted that this is to be compared with conventional blast furnace iron which has up to about approximately 0.05 percent sulfur maximum, and the slag from the blast furnace which has up to approximately 2 percent by weight of sulfur. The reason why the sulfur content of the cleaned blast furnace iron produced by this process is about 0.05 percent or less, notwithstanding the relatively high sulfur content of the slag, is because the amount of slag is so low as to be virtually insignificant as a sulfur contributor.

It is notable that the process of this invention can be varied within reasonable limits without departing from the spirit and scope of the invention. For example, the particular hardness, size or shape of the shot or grit used, the velocity imparted thereto and the flow rate thereof, the linear speed of the conveyor, and the precise size and quantity of the metalslag pieces, as well as the time during which the process is applied, can be varied without departing from the spirit and scope of the invention.

It is also notable that the process of this invention may be used to treat aluminum, brass, copper or other metals to remove slag from the crevices and fissures thereof.

what is claimed is:

1. A product of manufacture comprising: a multiplicity of irregularly shaped masses of blast-furnace slag-iron having a random size distribution throughout the range of up to a thickness of about 6 inches and a lateral dimension of about three feet and each article having a relatively low amount of slag substantially uniformly distributed therethrough and having at or in contact with its surface a large number of irregularities, crevices and fissures, a quantity of a contaminating slag rigidly adhered to the iron, at least part of said slag being located within said crevices and fissures, said slag comprising less than about ten percent by weight of the total weight of the product, said product having been produced by breaking blast furnace iron-slag into pieces having a substantial amount of such slag exposed at or to the surface of each piece;

continuously tumbling a mass of such pieces against each other in order to achieve a relatively uniform redistribution of such pieces within such mass; and while effecting such redistribution substantially continuously imparting such pieces with a shower of a substantial quantity of small particles having a hardness greater than the hardness of the slag impurities and at a high velocity and for a period of time sufficient to abrade such impurities from the iron.

2. A product as set forth in claim 1 wherein the iron of the blast-furnace slag-iron has a sulfur content of up to about 0.05 percent, and wherein wherein the slag of the blast-furnace slag-iron has a sulfur content of up to approximately 2 percent.

3. A product as set forth in claim 1 wherein the amount of such slag is up to about two percent.

* * * * *